US012374810B2

(12) United States Patent
Chiang

(10) Patent No.: US 12,374,810 B2
(45) Date of Patent: Jul. 29, 2025

(54) ANTENNA SYSTEM FOR ACCESSING WIRELESS SIGNAL OF MULTIPLE FREQUENCY BAND

(71) Applicant: MEDIATEK INC., Hsin-Chu (TW)

(72) Inventor: Chung-Hsin Chiang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 213 days.

(21) Appl. No.: 18/098,064

(22) Filed: Jan. 17, 2023

(65) Prior Publication Data

US 2023/0268670 A1 Aug. 24, 2023

Related U.S. Application Data

(60) Provisional application No. 63/311,514, filed on Feb. 18, 2022.

(51) Int. Cl.
*H01Q 21/30* (2006.01)
*H01Q 5/48* (2015.01)

(52) U.S. Cl.
CPC ............... *H01Q 21/30* (2013.01); *H01Q 5/48* (2015.01)

(58) Field of Classification Search
CPC H01Q 1/521; H01Q 5/40; H01Q 5/48; H01Q 15/006; H01Q 21/08; H01Q 21/28; H01Q 21/30
See application file for complete search history.

(56) References Cited

U.S. PATENT DOCUMENTS 6,211,841 B1 4/2001 Smith
6,552,687 B1 * 4/2003 Rawnick .............. H01Q 21/062 343/848
12,113,266 B2 * 10/2024 Hsieh ......................... H01P 5/10
2019/0267711 A1 * 8/2019 O'Brien ............... H01Q 15/006
2020/0220249 A1 * 7/2020 Asaf .................... H01Q 25/001
2020/0259240 A1 * 8/2020 Moallem .............. H01Q 9/0407
2021/0184335 A1 6/2021 Wang
2022/0045440 A1 * 2/2022 Le .......................... H01Q 21/26
2022/0077584 A1 * 3/2022 Kwak ....................... H01Q 5/40
2023/0216181 A1 * 7/2023 Saleh ................ H01Q 15/0086 343/718
2023/0216205 A1 * 7/2023 Li ...................... H01Q 15/0026 343/835

(Continued)

FOREIGN PATENT DOCUMENTS

CN 112821042 A 5/2021

*Primary Examiner* — Raymond R Chai
(74) *Attorney, Agent, or Firm* — Winston Hsu

(57) ABSTRACT

An antenna system includes a first antenna and a second antenna. The first antenna can include a first horizontal portion and be used to access a first wireless signal. The first wireless signal can be wirelessly transmitted and/or received over air through the first horizontal portion and a first reference layer. The second antenna can include a second horizontal portion and be used to access a second wireless signal. The second wireless signal can be wirelessly transmitted and/or received over the air through the second horizontal portion and a second reference layer different from the first reference layer. The first wireless signal can be in a first frequency band, the second wireless signal can be in a second frequency band, and frequencies in the second frequency band can be higher than frequencies in the first frequency band.

20 Claims, 16 Drawing Sheets

(56) References Cited

U.S. PATENT DOCUMENTS

| | | | | |
|---|---|---|---|---|
| 2023/0231317 | A1* | 7/2023 | Miki | H01Q 15/008 343/702 |
| 2023/0261392 | A1* | 8/2023 | Sakr | H01Q 5/40 343/702 |
| 2024/0021996 | A1* | 1/2024 | Yang | H01Q 9/0414 |
| 2024/0170849 | A1* | 5/2024 | Chahat | H01Q 9/0442 |

* cited by examiner

ANTENNA SYSTEM FOR ACCESSING WIRELESS SIGNAL OF MULTIPLE FREQUENCY BAND

CROSS REFERENCE TO RELATED APPLICATIONS

This application claims the benefit of U.S. Provisional Application No. 63/311,514, filed on Feb. 18, 2022. The content of the application is incorporated herein by reference.

BACKGROUND

As the demand for wireless communications increases, it becomes an important issue to install antennas of multiple frequency bands in the same device. For example, a mobile phone that supports multiple frequency bands can greatly improve user's experience. However, it is a challenge to install antennas of different frequency bands in the same device.

In an antenna, the thickness between a radiating element for accessing wireless signals and a reference plane is related to the frequency of the signal. Generally speaking, the higher the frequency, the smaller the thickness would be. Hence, reference planes of different heights are set for antennas corresponding to different frequency bands. In order to match the positions of different reference planes, the layout and numbers of antennas are highly limited.

Since a high-frequency antenna array has a shorter wavelength, the distances between the antennas can be smaller and the number of antennas can be increased in the high-frequency antenna array. However it is difficult to integrate an antenna with a high frequency band and an antenna with a low frequency band in the same device. In addition, problems such as low antenna efficiency, high antenna pattern distortion, mutual couplings between different antennas, weak resonance and low antenna gain are observed. Hence, a solution is in need for integrating antennas of different frequency bands in the same device.

SUMMARY

An embodiment provides an antenna system including a first antenna and a second antenna. The first antenna can include a first horizontal portion and be used to access a first wireless signal. The first wireless signal can be wirelessly transmitted and/or received over air through the first horizontal portion and a first reference layer. The second antenna can include a second horizontal portion and be used to access a second wireless signal. The second wireless signal can be wirelessly transmitted and/or received over the air through the second horizontal portion and a second reference layer different from the first reference layer. The first wireless signal can be in a first frequency band, the second wireless signal can be in a second frequency band, and frequencies in the second frequency band can be higher than frequencies in the first frequency band.

Another embodiment provides an antenna system including m first antennas and n second antennas. Each first antenna can include a first horizontal portion and be used to access a first wireless signal, and the first wireless signal can be wirelessly transmitted and/or received over air through the first horizontal portion and a first reference layer. Each second antenna can include a second horizontal portion and be used to access a second wireless signal, and the second wireless signal can be wirelessly transmitted and/or received over the air through the second horizontal portion and a second reference layer different from the first reference layer. The first wireless signal can be in a first frequency band, the second wireless signal can be in a second frequency band, frequencies in the second frequency band can be higher than frequencies in the first frequency band, m and n can be integers larger than 1, and $m<n$.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
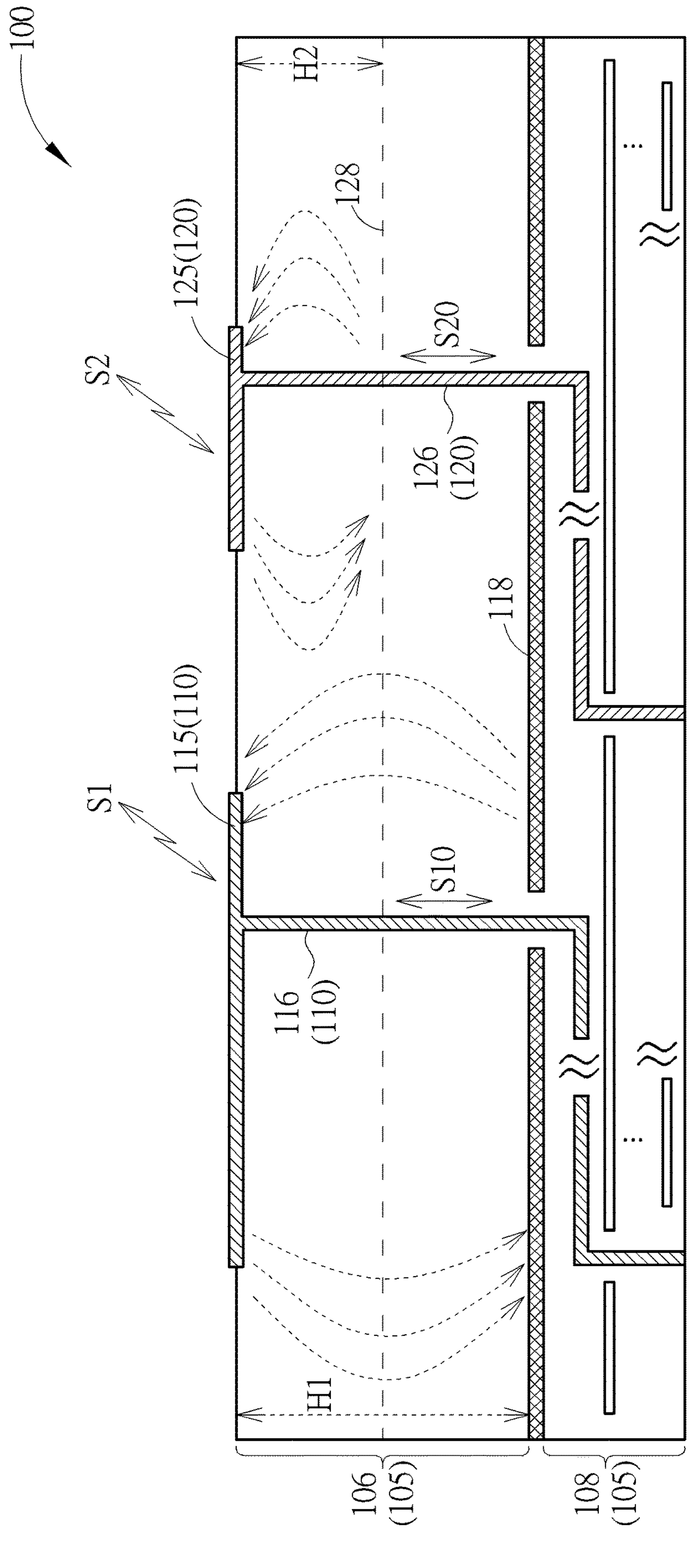
FIG. 1 to FIG. 11 and FIG. 13 to FIG. 16 illustrate antenna systems according to different embodiments.

FIG. 1 illustrates a sectional view of an antenna system 100 according to an embodiment. The antenna system 100 can include a first antenna 110 and a second antenna 120. The first antenna 110 can include a first horizontal portion 115 used to access a first wireless signal S1. The first wireless signal S1 can be wirelessly transmitted and/or received over the air through the first horizontal portion 115 and a first reference layer 118. The second antenna 120 can include a second horizontal portion 125 used to access a second wireless signal S2. The second wireless signal S2 can be wirelessly transmitted and/or received over the air through the second horizontal portion 125 and a second reference layer 128 different from the first reference layer 118. The first wireless signal S1 can be in a first frequency band, the second wireless signal S2 can be in a second frequency band, and frequencies in the second frequency band are higher than frequencies in the first frequency band. In other words, the first antenna 110 can access wireless signals of a lower frequency band, and the second antenna 120 can access wireless signals of a higher frequency band. In some embodiments, the ratio of the highest frequency of the higher frequency band to the lowest frequency of the lower frequency may be larger than 2.

For example, in 5G millimeter wave (mmWave) communications, the lower frequency band corresponding to the first antenna 110 can be lower than 30 gigahertz (GHz), and the higher frequency band corresponding to the second antenna 120 can be between 30 to 71 GHz.

The first antenna 110 can further include a first feeding element 116 used to access a first transmission signal S10 corresponding to the first wireless signal S1. The second antenna 120 can further include a second feeding element 126 used to access a second transmission signal S20 corresponding to the second wireless signal S2.

In FIG. 1, the first feeding element 116 can be connected to the first horizontal portion 115, and the second feeding element 126 can be connected to the second horizontal portion 125, however, embodiments are not limited thereto.

A vertical distance H1 between the first horizontal portion 115 and the first reference layer 118 can be larger than a vertical distance H2 between the second horizontal portion 125 and the second reference layer 128.

The first reference layer 118 can be a ground layer. The second reference layer 128 can be a reference plane generated with a meta-surface material, meta-material, frequency selective surface (FSS) material, electromagnetic band gap (EBG) material, artificial impedance surface material and/or periodic structures. Signals of a lower frequency band can be transmitted and/or received through the second reference layer 128, and signals of a higher frequency band can be blocked by the second reference layer 128. In other words, the second reference layer 128 can have a low-pass characteristic. Hence, by setting the second reference layer 128, the thickness (e.g. H1) of the antenna accessing low frequency signals can be greater than the thickness (e.g. H2) of the antenna accessing high frequency signals. As a result, antennas of different frequency bands can be integrated in the same device, such as the same substrate or the same circuit board.

In FIG. 1, the first antenna 110 and the second antenna 120 are formed in the same substrate 105. The first antenna 110 and the second antenna 120 can be formed in an antenna layer 106 of the substrate 105. The first transmission signal S10 and the second transmission signal S20 can be transmitted to a circuit layer 108 of the substrate 105 or received from the circuit layer 108 of the substrate 105. The circuit layer 108 can be formed by a plurality of conductive layers.

Figure 2:
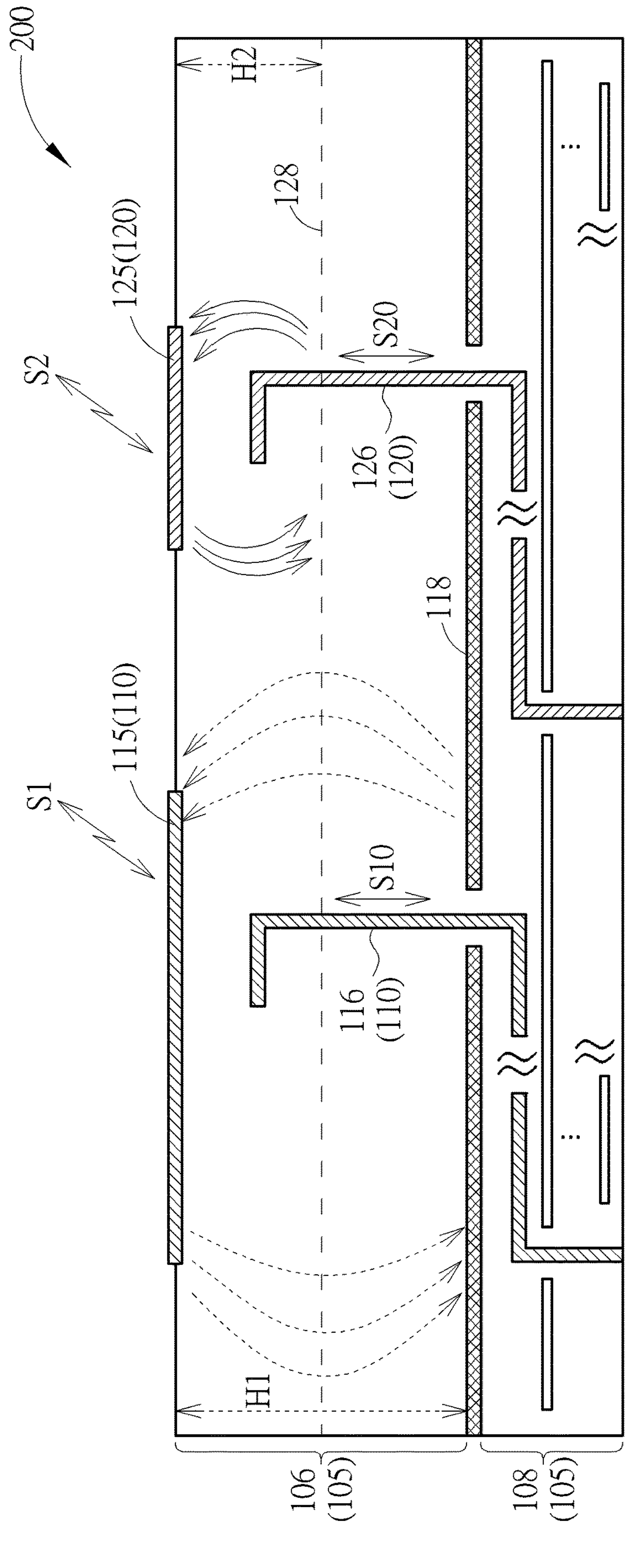

Below, FIG. 2 to FIG. 16 illustrate antenna systems of different embodiments. Similarities in FIG. 1 to FIG. 16 are not repeatedly described. FIG. 2 illustrates a sectional view of an antenna system 200 according to another embodiment. In antenna system 200, the first antenna 110 can include a first feeding element 116 disconnected from the first horizontal portion 115 and used to access a first transmission signal S10 corresponding to the first wireless signal S1. Between the first feeding element 116 and the first horizontal portion 115, signals can be transmitted and/or received through wireless couplings. The second antenna 120 can include a second feeding element 126 disconnected from the second horizontal portion 125 and used to access the second transmission signal S20 corresponding to the second wireless signal S2. Between the second feeding element 126 and the second horizontal portion 115, signals can be transmitted and/or received through wireless couplings.

Figure 3:
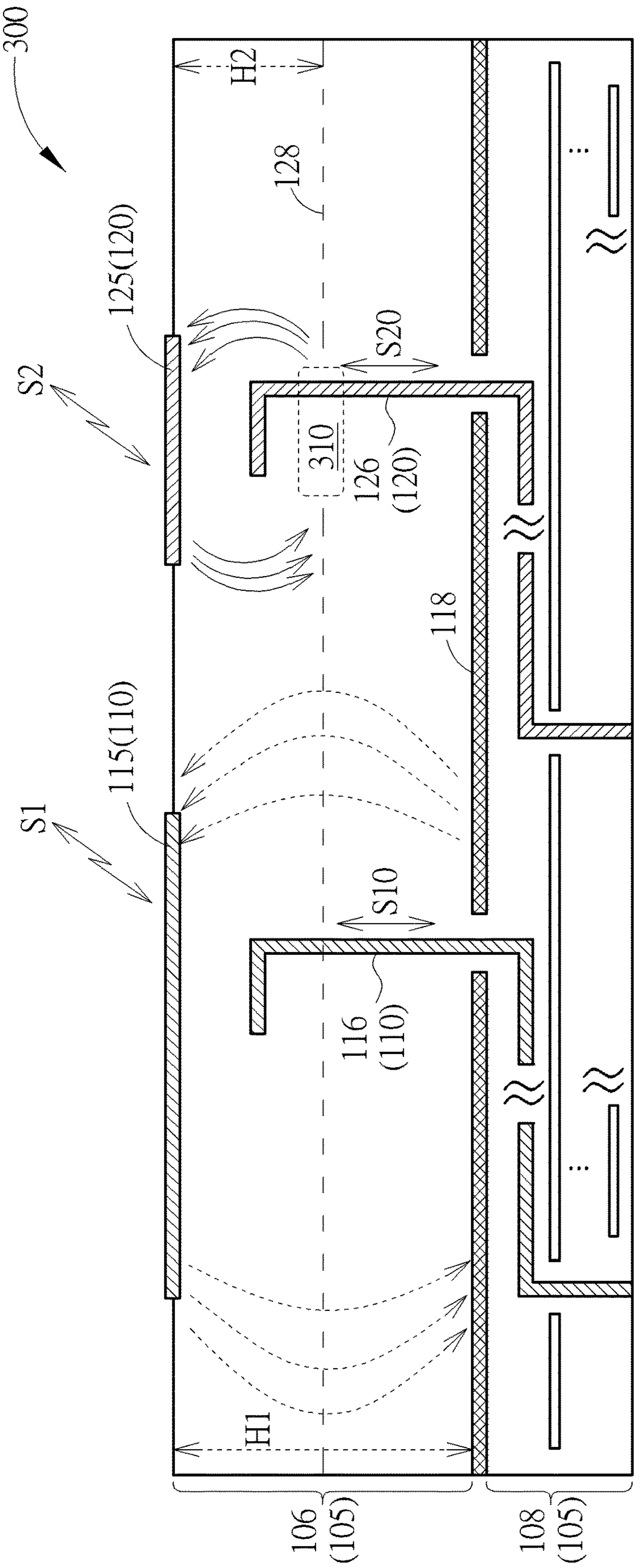

FIG. 3 illustrates a sectional view of an antenna system 300 according to another embodiment. The second reference layer 128 can have an opening 310 used to adjust the second frequency band of the second antenna 120 and to allow the second feeding element 126 to pass through. For example, the opening 310 can increase the bandwidth of the second frequency band. In FIG. 3, the feeding elements (e.g. 116 and 126) are disconnected from the radiating portions of the antennas (e.g. 115 and 125); however, this is merely an example. For an antenna system similar to the antenna system 100 in FIG. 1, the second reference layer 128 can also have an opening to adjust the second frequency band.

Figure 4:
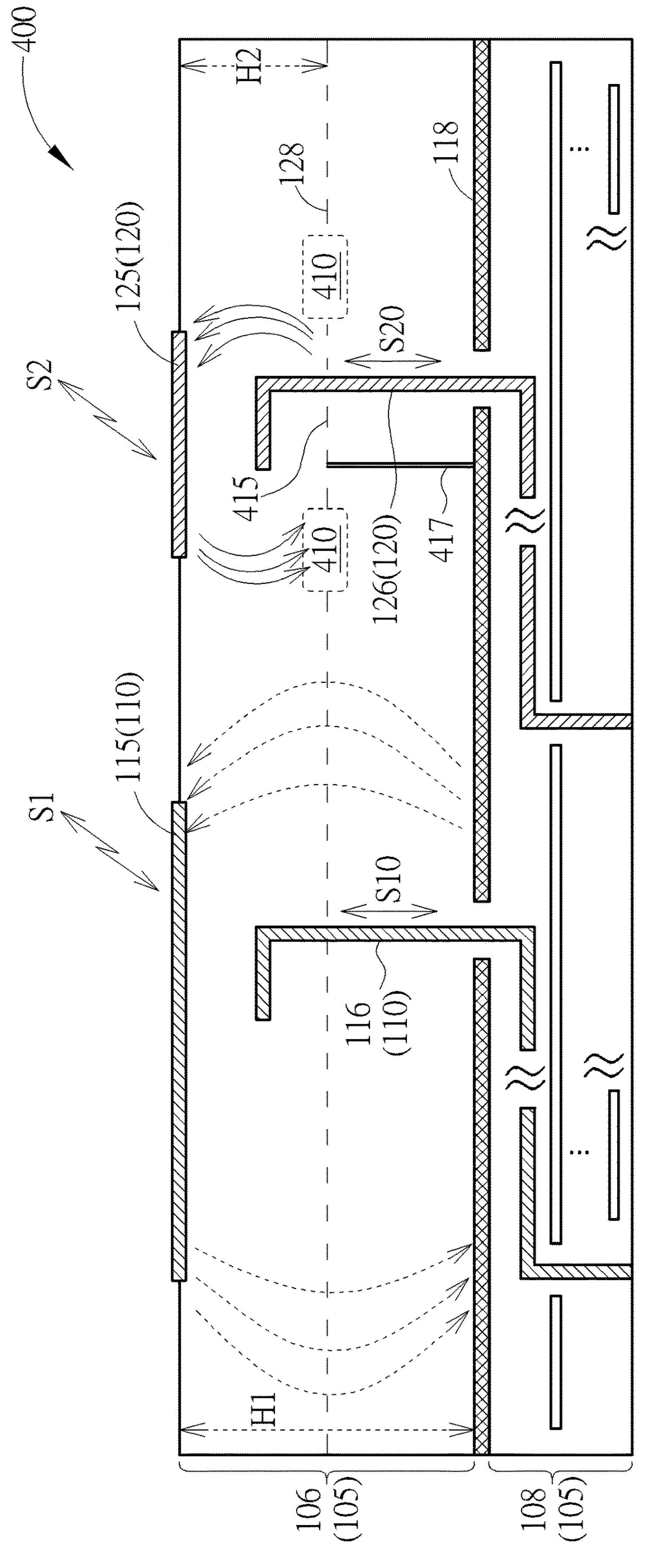

FIG. 4 illustrates a sectional view of an antenna system 400 according to another embodiment. The second reference layer 128 can have an annular opening 410 used to adjust the second frequency band of the second antenna 120. In a top view, the annular opening 410 can have a circular shape, a rectangular shape, a square shape or another regular or irregular shape for adjusting the second frequency band. Columnar element(s) 417 can be selectively used to support an encircled portion 415 of the annular opening 410. In FIG. 4, the feeding elements (e.g. 116 and 126) are disconnected from the radiating portions of the antennas (e.g. 115 and 125); however, this is merely an example. For an antenna system similar to the antenna system 100 in FIG. 1, the second reference layer 128 can also have an annular opening to adjust the second frequency band.

Figure 5:
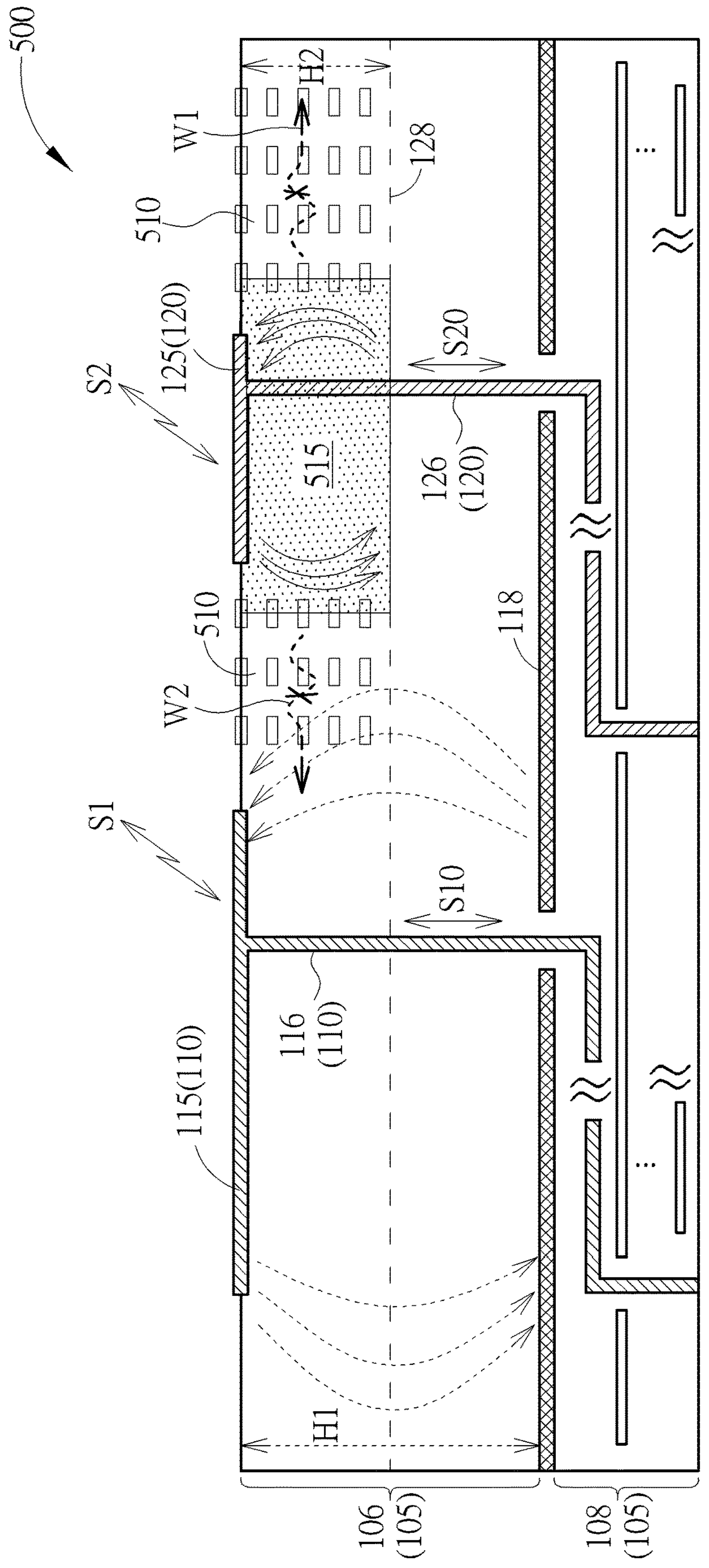

FIG. 5 illustrates a sectional view of an antenna system 500 according to another embodiment. The antenna system 500 can further include an electromagnetic band gap layer 510 used to reduce unwanted surface waves W1 and W2. The surface waves W1 and W2 will interrupt the radiation of the antenna system 500, and the performance of the antenna system 500 is improved by reducing the surface waves W1 and W2. The electromagnetic band gap layer 510 can be disposed between the second horizontal portion 125 and the second reference layer 128. A cavity 515 can be retained without filling the electromagnetic band gap layer 510 so as to allow the transmission of the second wireless signal S2.

Figure 6:
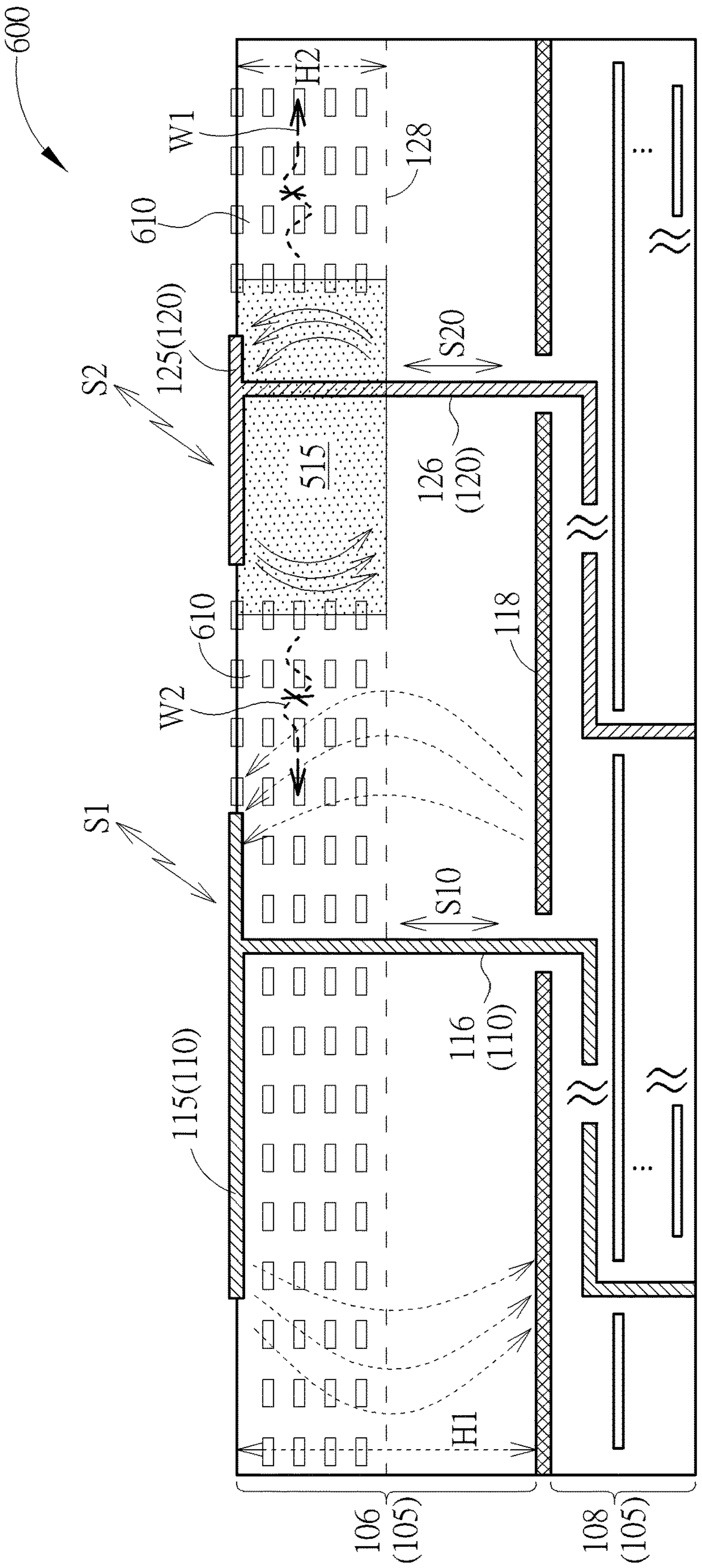

FIG. 6 illustrates a sectional view of an antenna system 600 according to another embodiment. The antenna system 600 can be similar to the antenna system 500. The antenna system 600 can have an electromagnetic band gap layer 610. The electromagnetic band gap layer 610 can be used to reduce surface waves W1 and W2, and be disposed below the first horizontal portion 115 and the second horizontal portion 125 and above the second reference layer 128. In other words, compared with the electromagnetic band gap layer 510 in FIG. 5, the electromagnetic band gap layer 610 can be extended to be below the first horizontal portion 115. Under the first horizontal portion 115, the electromagnetic band gap layer 610 can include no cavity since the signal of lower frequency band can be transmitted through the electromagnetic band gap layer 510.

In FIG. 1 to FIG. 6, the first horizontal portion 115 and/or the second horizontal portion 125 can be a patch, and embodiments are not limited thereto.

Figure 7:
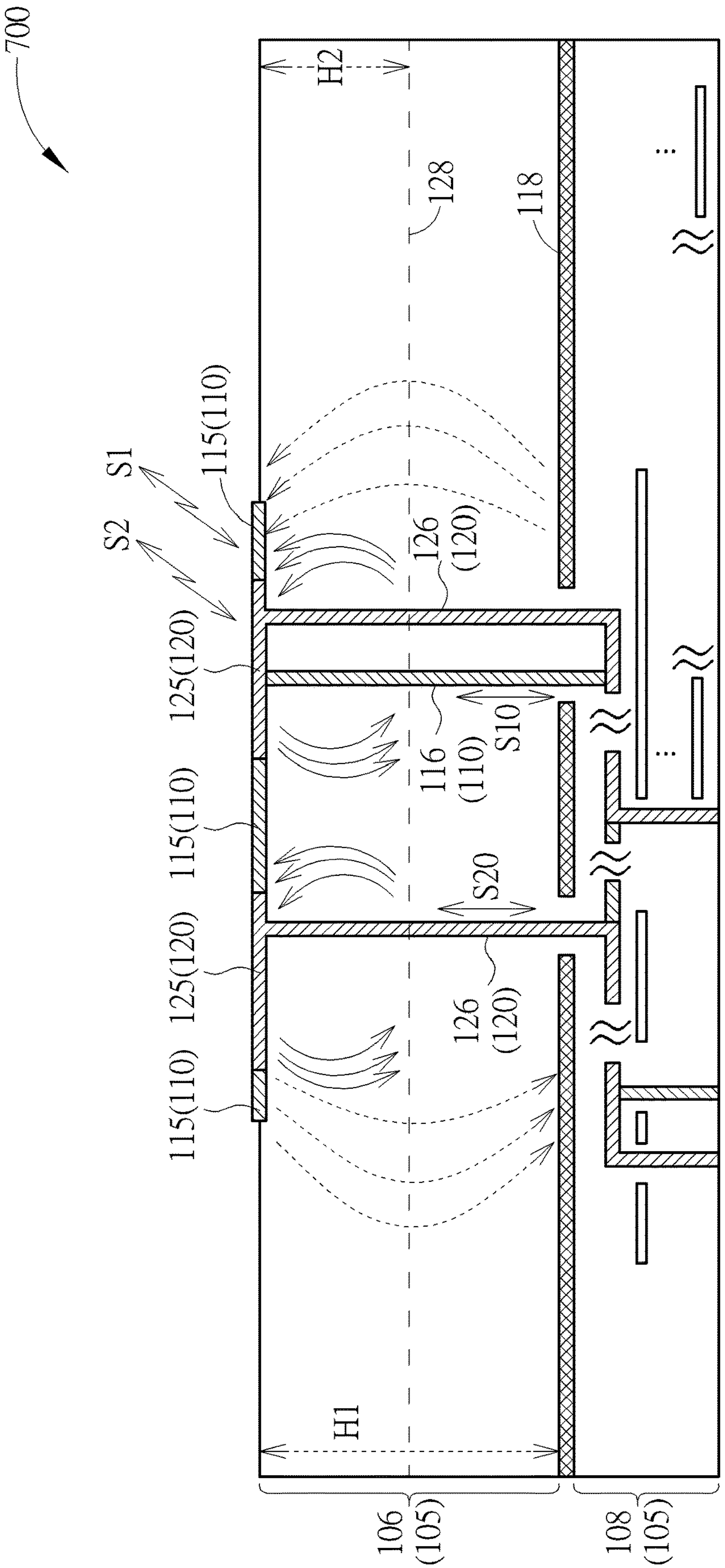
Figure 8:
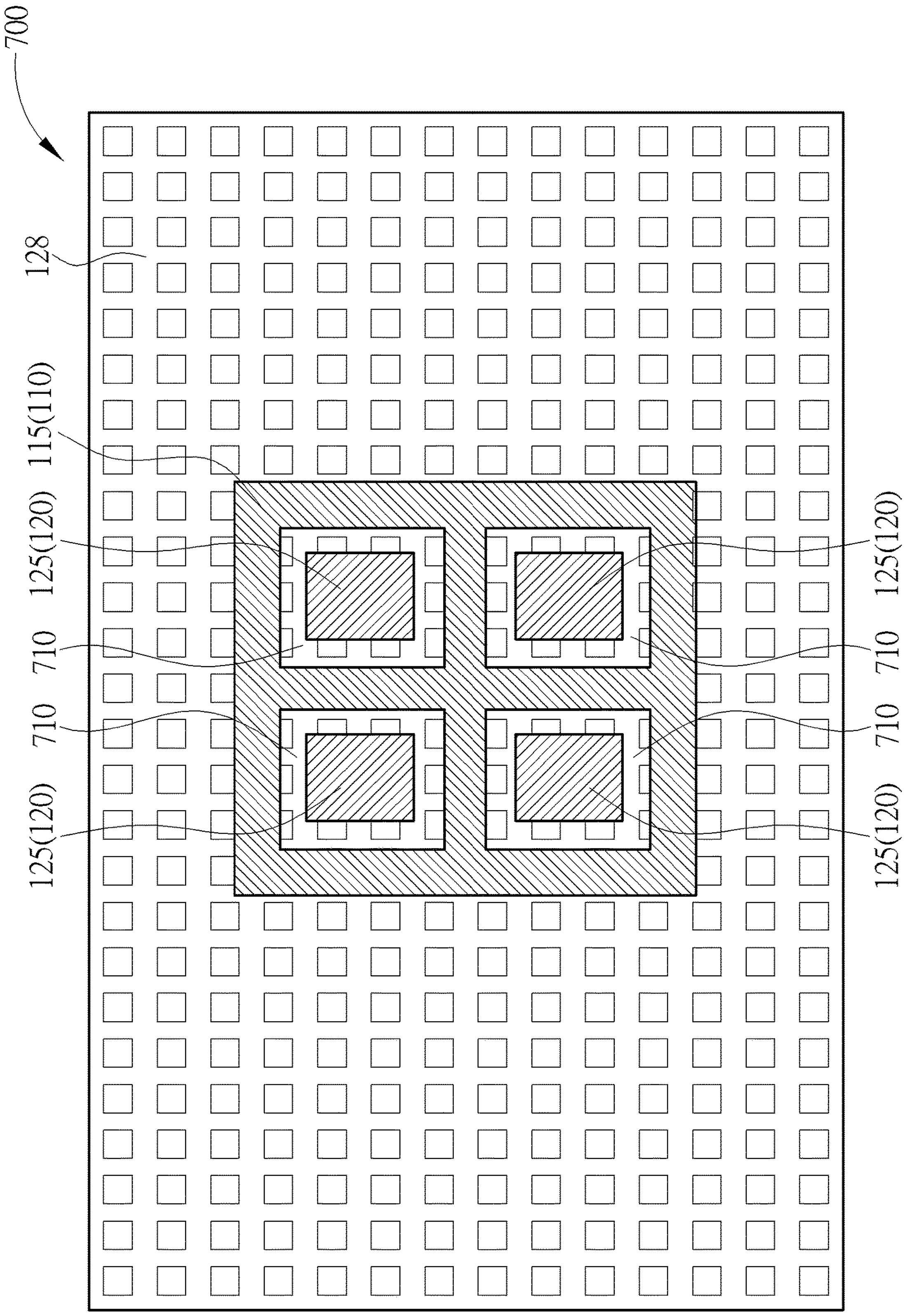

FIG. 7 illustrates a sectional view of an antenna system 700 according to another embodiment. FIG. 8 illustrates a top view of the antenna system 700. In the antenna system 700, the first horizontal portion 115 can have at least one aperture 710. The second horizontal portion 125 can be disposed in the aperture 710. In the example of FIG. 7 and FIG. 8, the first horizontal portion 115 is shown with four apertures 710, and four second horizontal portions 125 are disposed in the four apertures 710 respectively. Hence, a plurality of second horizontal portions 125 can be disposed within the bounds of the first horizontal portion 115. As a result, in the same device, the number of high-frequency antennas can be more than the number of low-frequency antennas, and the layout of the antennas is more flexible since a high-frequency antenna and a low-frequency antenna can be disposed in the same area.

The first horizontal portion 115 of the first antenna 110 and the second horizontal portion 125 of the second antenna 120 can be of the same conductive layer according to embodiments. In other embodiments, the first horizontal portion 115 can be of a first conductive layer, and the second horizontal portion 125 can be of a second conductive layer different form the first conductive layer.

Figure 9:
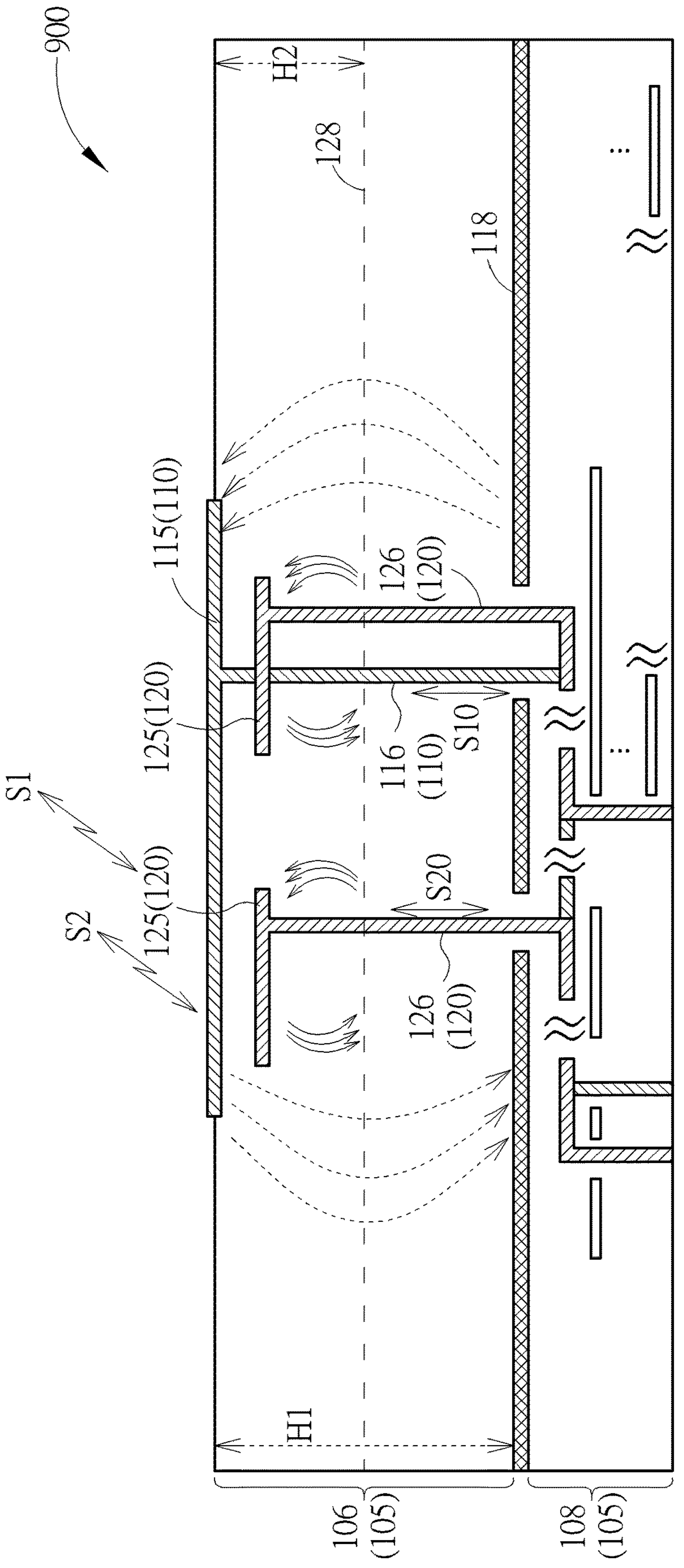

FIG. 9 illustrates a sectional view of an antenna system 900 according to another embodiment. In FIG. 9, the first horizontal portion 115 and the second horizontal portion 125 can be of different conductive layers. A top view of the antenna system 900 can be similar to FIG. 8, where each second horizontal portion 125 can be arranged in an aperture of the first horizontal portion 115.

Figure 10:
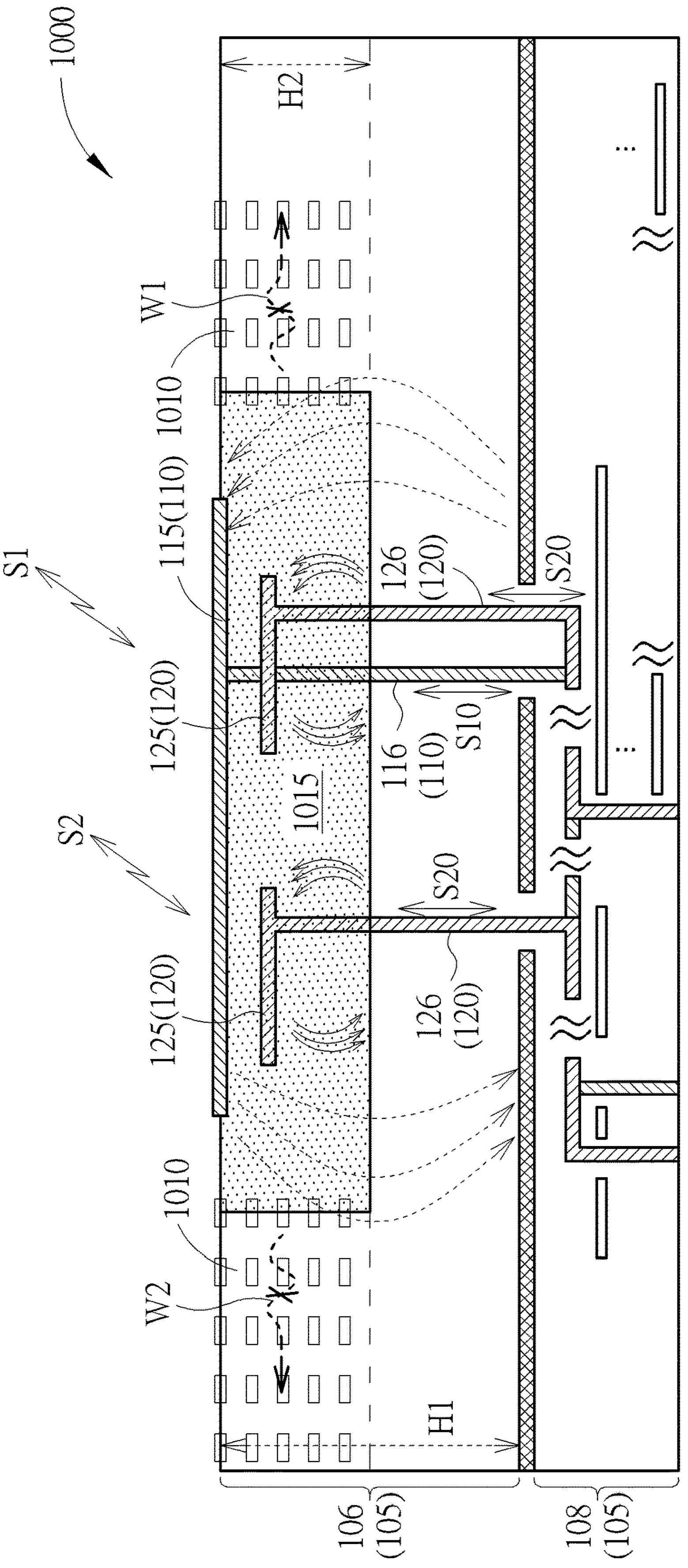

FIG. 10 illustrates a sectional view of an antenna system 1000 according to another embodiment. The antenna system 1000 can be similar to the antenna system 900, and antenna system 1000 can further include an electromagnetic band gap layer 1010. The electromagnetic band gap layer 1010 can reduce surface waves W1 and W2 to improve the performance of the antenna system 1000. A cavity 1015 can be retained without filling the electromagnetic band gap layer 1010 so as to allow the transmission of the second wireless signal S2.

Figure 11:
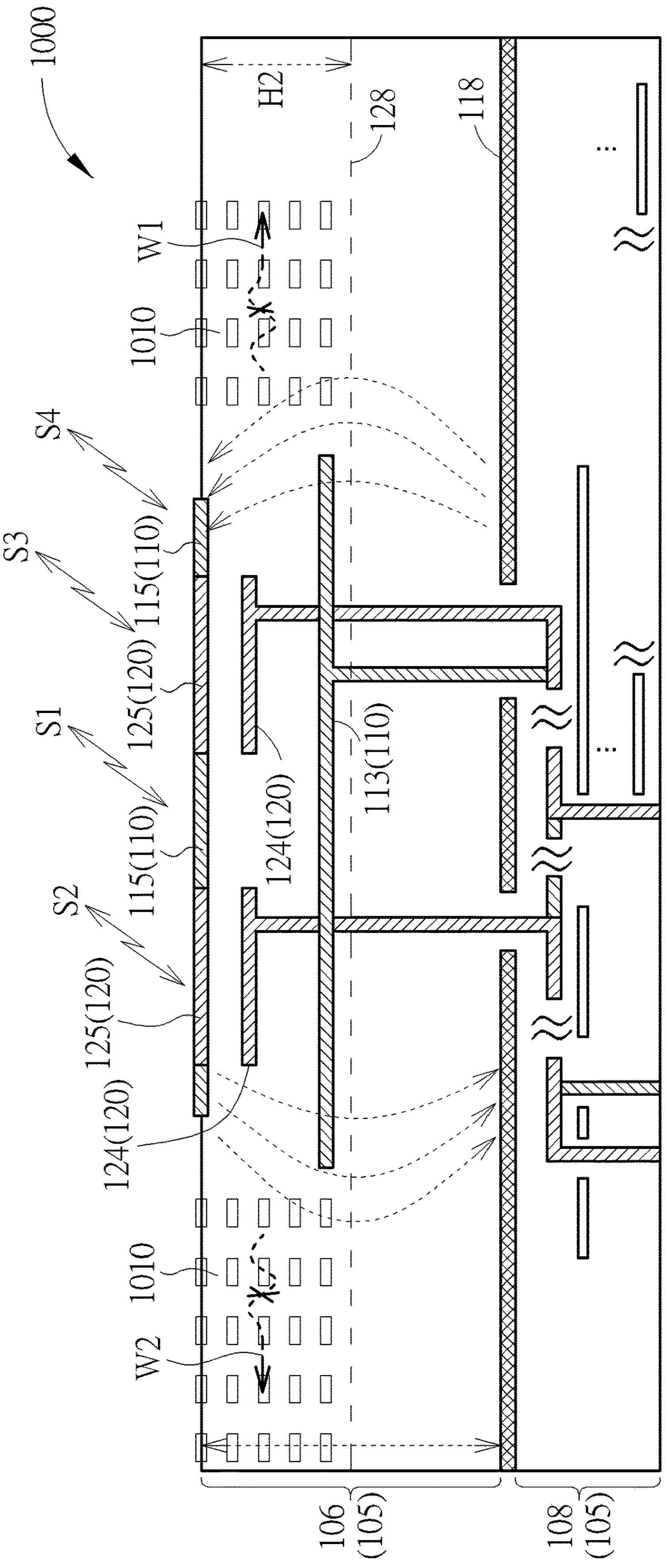

FIG. 11 illustrates a sectional view of an antenna system 1100 according to another embodiment. Compare with the abovementioned antenna systems, in the antenna system 1100, the first antenna 110 can further include a third horizontal portion 113, and the second antenna 120 can further include a fourth horizontal portion 124. The third horizontal portion 113 can be used to access a third wireless signal S3. The third wireless signal S3 can be in a third frequency band, where frequencies in the third frequency band can be lower than frequencies in the second frequency band. The fourth horizontal portion 124 can be used to access a fourth wireless signal S4. The fourth wireless signal S4 can be in a fourth frequency band, where frequencies in the fourth frequency band can be higher than frequencies in the first frequency band and frequencies in the third frequency band. The antenna system 1100 can selectively include the electromagnetic band gap layer 1010 for reducing surface waves W1 and W2, however, the electromagnetic band gap layer 1010 can be omitted if the performance is adequate.

Figure 12:
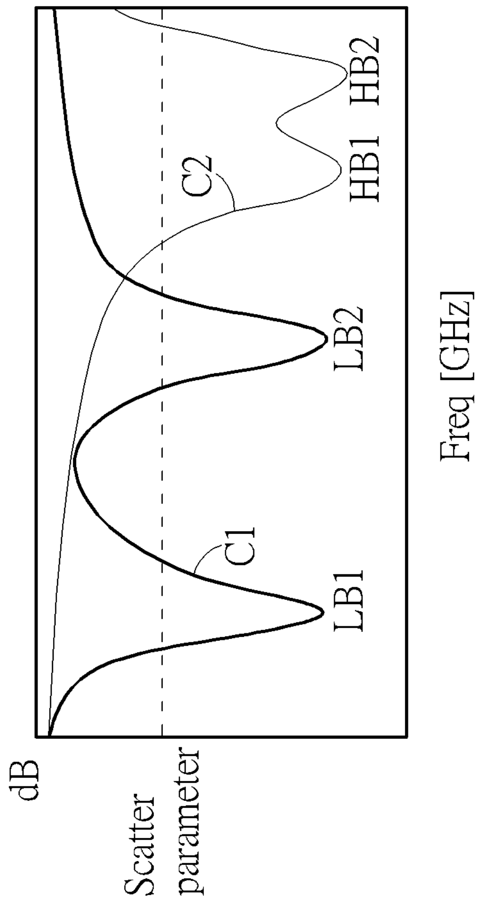
FIG. 12 illustrates the curves of scattering parameters of the antenna system in FIG. 11.

FIG. 12 illustrates the curves of scattering parameters of the antenna system 1100 in FIG. 11. The curve C1 represents the scattering parameters of the first antenna 110, and the curve C2 represents the scattering parameters of the second antenna 120. The trough LB1 can be corresponding to the first frequency band, and the trough LB2 can be corresponding to the third frequency band, where the trough LB2 can be generated with the third horizontal portion 113. The trough HB1 can be corresponding to the second frequency band, and the trough HB2 can be corresponding to the fourth frequency band, where the trough HB2 can be generated with the fourth horizontal portion 124. As a result, the frequency band of the first antenna 110 can be widened by the third horizontal portion 113, and the frequency band of the second antenna 120 can be widened by the fourth horizontal portion 124.

In FIG. 11 and FIG. 12, both the first antenna 110 and the second antenna 120 include two horizontal portions. However, one of the first antenna 110 and the second antenna 120 can include two horizontal portions while the other one of the first antenna 110 and the second antenna 120 can have only one horizontal portion.

Figure 13:
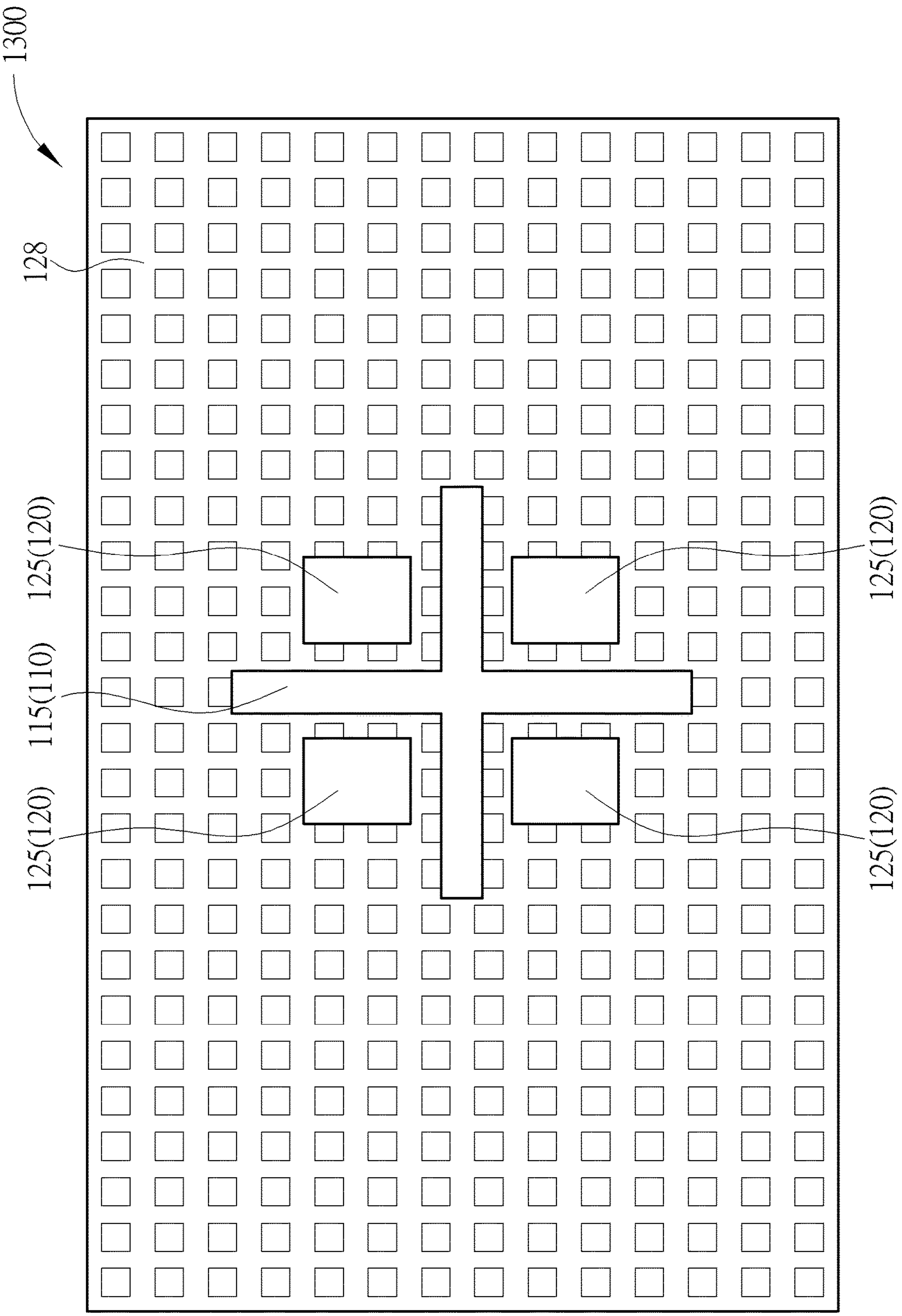

FIG. 13 illustrates a top view of an antenna system 1300 according to another embodiment. In FIG. 13, the first horizontal portion 115 can have a cross shape, and each second horizontal portion 125 can be disposed at an angle formed by two fins of the first horizontal portion 115. Hence, in the same device, the number of high-frequency antennas can be more than the number of low-frequency antennas, and the layout of the antennas is more flexible.

Figure 14:
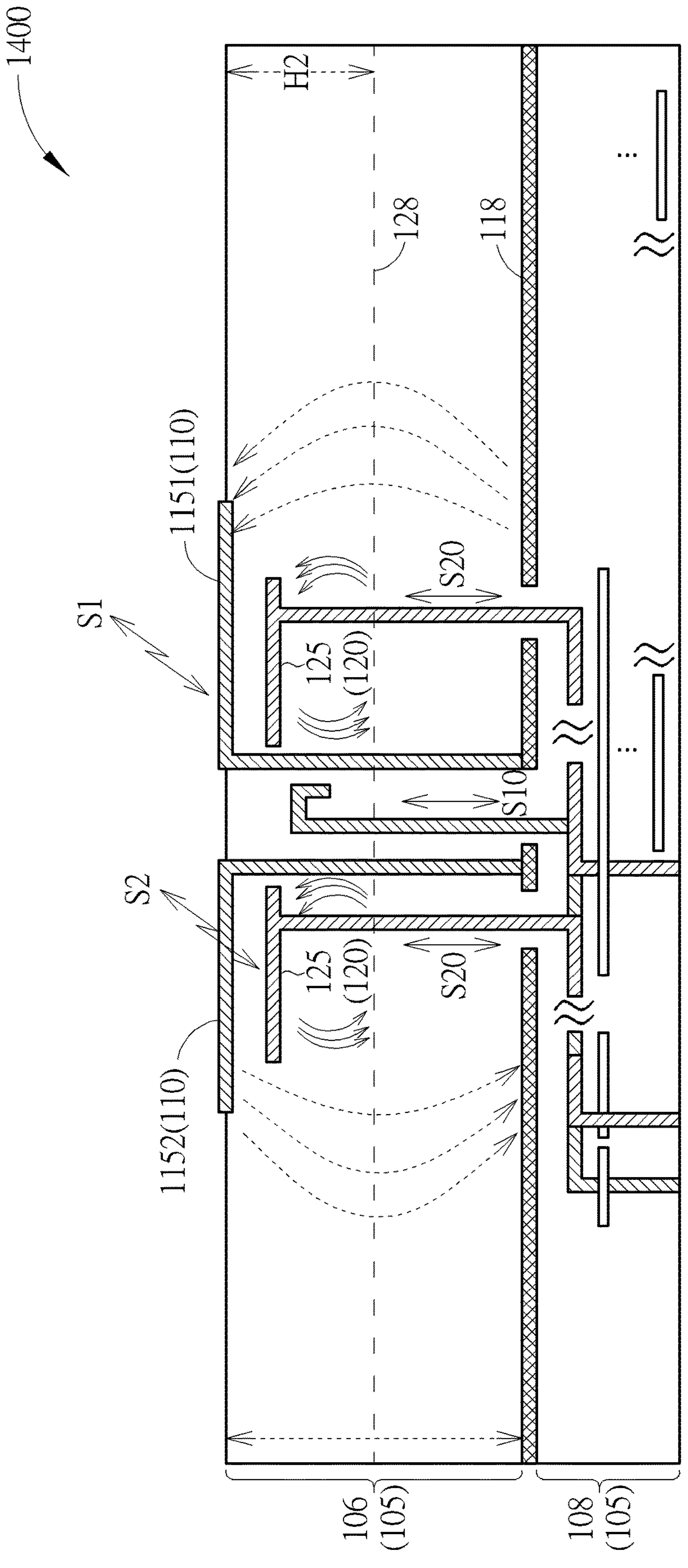

FIG. 14 illustrates a sectional view of an antenna system 1400 according to another embodiment. The first horizontal portion 115 can include a first arm 1151 and a second arm 1152. The first antenna 110 can also include a first feeding element 116 disconnected from the first arm 1151 and the second arm 1152 and used to access the first transmission signal S10 corresponding to the first wireless signal S1. Likewise, the second horizontal portion 125 can include a first arm and a second arm. The second antenna 120 can also include a second feeding element disconnected from the first arm and the second arm of the second horizontal portion 125 and used to access the second transmission signal S20 corresponding to the second wireless signal S2.

Each of the first antenna 110 and the second antenna 120 can include a patch antenna, a dipole antenna, a planar inverted-F antenna (PIFA), a monopole antenna, a slot antenna and/or an aperture antenna.

Figure 15:
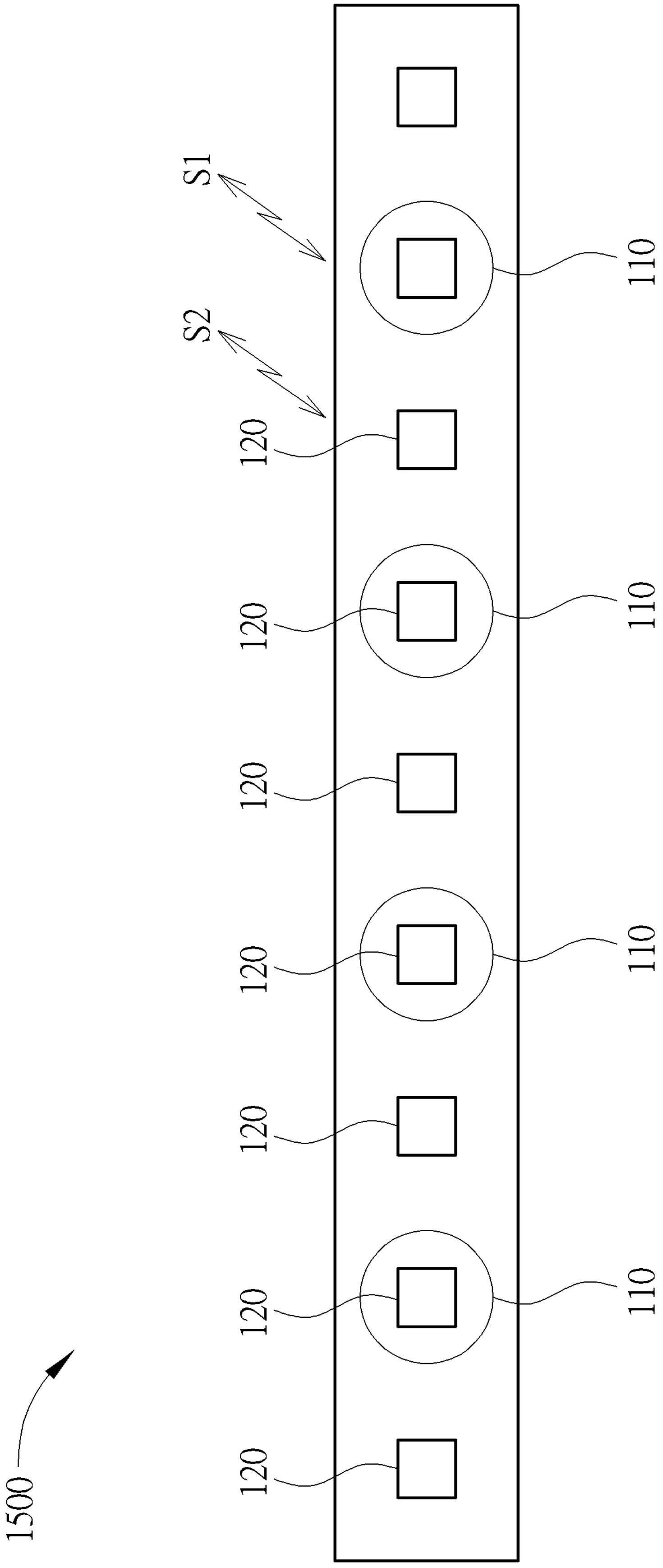

FIG. 15 illustrates a top view of an antenna system 1500 according to another embodiment. In FIG. 15, some of the second antennas 120 can be encircled by the first antennas 110, and other second antennas 120 can be disposed outside the bounds of the first antennas 110. Hence, the number of the second antennas 120 can be greater than the number of the first antennas 110. The antenna system 1500 can include m first antennas 110 and n second antennas 120, m and n are integers larger than 1, and m<n. In the antenna system 1500, the first wireless signal S1 accessed by the first antenna 110 can be transmitted and/or received over the air through the first horizontal portion 115 and the first reference layer 118, and the second wireless signal S2 accessed by the second antenna 120 can be transmitted and/or received over the air through the second horizontal portion 125 and the second reference layer 128. Hence, compare with an antenna array formed with the first antennas 110, the second antennas 120 can form an antenna array with a larger number of antennas for accessing wireless signals of a higher frequency band.

Figure 16:
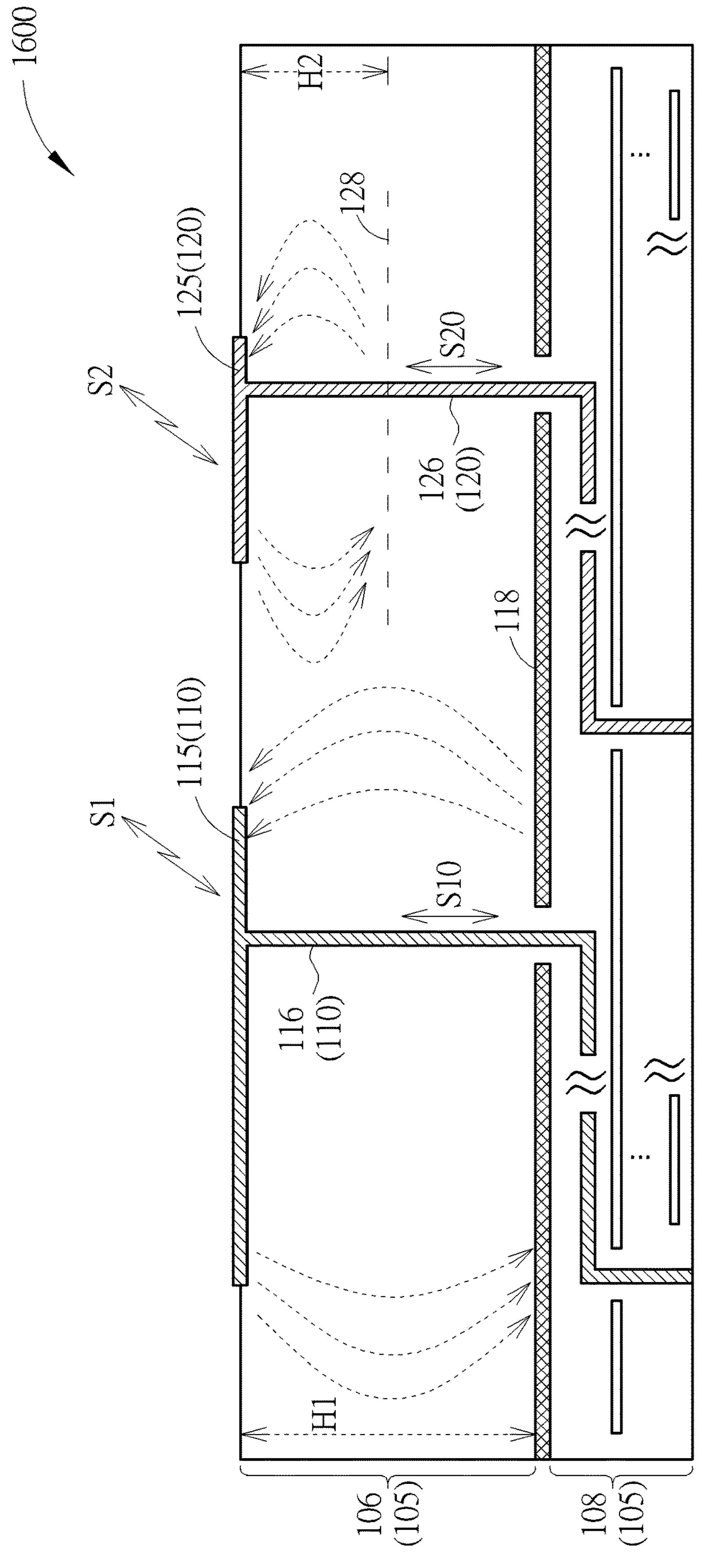

FIG. 16 illustrates a sectional view of an antenna system 1600 according to another embodiment. The antenna system 1600 can be similar to the antenna system 100 in FIG. 1; however, the second reference layer 128 can be disposed below the second horizontal portion 125 but not the first horizontal portion 115. The area of the second reference layer 128 can be determined accordingly.

In summary, by setting the second reference layer 128, the first antenna 110 of a lower frequency band and the second antenna 120 of a higher frequency band can be disposed in the same area, and the number of the second antennas 120 can be greater than the number of the first antennas 110. Solutions for reducing unwanted surface waves are also provide to improve the performance. In the applications such as 5G millimeter wave (mmWave) technology, the abovementioned antenna systems can reduce problems such as low antenna efficiency, high antenna pattern distortion, mutual couplings between different antenna arrays, weak resonance and low antenna gain.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An antenna system comprising:

a first antenna, comprising a first horizontal portion and configured to access a first wireless signal, the first wireless signal being wirelessly transmitted and/or received over air through the first horizontal portion and a first reference layer; and a second antenna comprising a second horizontal portion and configured to access a second wireless signal, the second wireless signal being wirelessly transmitted and/or received over the air through the second horizontal portion and a second reference layer different from the first reference layer;

wherein the first wireless signal is in a first frequency band, the second wireless signal is in a second frequency band, and frequencies in the second frequency band are higher than frequencies in the first frequency band;

wherein the second reference layer has an opening configured to adjust the second frequency band.

2. The antenna system of claim 1, wherein a vertical distance between the first horizontal portion and the first reference layer is larger than a vertical distance between the second horizontal portion and the second reference layer.

3. The antenna system of claim 1, wherein:
the first antenna further comprises a first feeding element disconnected from the first horizontal portion and configured to access a first transmission signal corresponding to the first wireless signal; and
the second antenna further comprises a second feeding element disconnected from the second horizontal portion and configured to access a second transmission signal corresponding to the second wireless signal.

4. The antenna system of claim 1, wherein:
the second antenna further comprises a feeding element disconnected from the second horizontal portion and configured to access a second transmission signal corresponding to the second wireless signal; and
the second reference layer has an opening configured to adjust the second frequency band and to allow the feeding element to pass through.

5. The antenna system of claim 1, wherein the opening of the second reference layer is an annular opening.

6. The antenna system of claim 1, further comprising:
an electromagnetic band gap layer configured to reduce a surface wave and disposed below the first horizontal portion and the second horizontal portion and above the second reference layer.

7. The antenna system of claim 1, wherein the first horizontal portion and/or the second horizontal portion is a patch.

8. The antenna system of claim 1, wherein:
the first horizontal portion has an aperture; and
the second horizontal portion is disposed in the aperture.

9. The antenna system of claim 1, wherein the first horizontal portion and the second horizontal portion are of a same conductive layer.

10. The antenna system of claim 1, wherein the first horizontal portion is of a first conductive layer, and the second horizontal portion is of a second conductive layer different form the first conductive layer.

11. The antenna system of claim 1, further comprising:
an electromagnetic band gap layer configured to reduce a surface wave;
wherein the electromagnetic band gap layer is disposed below the first horizontal portion and the second horizontal portion and above the second reference layer, the electromagnetic band gap layer has an aperture, and the first horizontal portion and the second horizontal portion are within bounds of the aperture.

12. The antenna system of claim 1, wherein the first antenna further comprises:
a third horizontal portion configured to access a third wireless signal, the third wireless signal being in a third frequency band, frequencies in the third frequency band being lower than the frequencies in the second frequency band.

13. The antenna system of claim 1, wherein a ratio between a highest frequency of the second frequency band and a lowest frequency of the first frequency is larger than 2.

14. The antenna system of claim 1, wherein the second antenna further comprises:
a fourth horizontal portion configured to access a fourth wireless signal, the fourth wireless signal being in a fourth frequency band, frequencies in the fourth frequency band being higher than the frequencies in the first frequency band.

15. The antenna system of claim 1, wherein the first horizontal portion has a cross shape, and the second horizontal portion is disposed at an angle formed by two fins of the first horizontal portion.

16. The antenna system of claim 1, wherein:
the first horizontal portion comprises a first arm and a second arm; and
the first antenna further comprises a feeding element disconnected from the first arm and the second arm and configured to access a transmission signal corresponding to the first wireless signal.

17. The antenna system of claim 1, wherein:
the second horizontal portion comprises a first arm and a second arm; and
the second antenna further comprises a feeding element disconnected from the first arm and the second arm and configured to access a transmission signal corresponding to the second wireless signal.

18. The antenna system of claim 1, wherein each of the first antenna and the second antenna comprises a patch antenna, a dipole antenna, a planar inverted-F antenna, a monopole antenna, a slot antenna and/or an aperture antenna.

19. An antenna system comprising:
m first antennas each comprising a first horizontal portion and configured to access a first wireless signal, wherein the first wireless signal is wirelessly transmitted and/or received over air through the first horizontal portion and a first reference layer; and
n second antennas each comprising a second horizontal portion and configured to access a second wireless signal, wherein the second wireless signal is wirelessly transmitted and/or received over the air through the second horizontal portion and a second reference layer different from the first reference layer;
wherein the first wireless signal is in a first frequency band, the second wireless signal is in a second frequency band, frequencies in the second frequency band are higher than frequencies in the first frequency band, m and n are integers larger than 1, and $m<n$;
wherein the second reference layer has an opening configured to adjust the second frequency band.

20. An antenna system comprising:
a first antenna, comprising a first horizontal portion and configured to access a first wireless signal, the first wireless signal being wirelessly transmitted and/or received over air through the first horizontal portion and a first reference layer;
a second antenna comprising a second horizontal portion and configured to access a second wireless signal, the second wireless signal being wirelessly transmitted and/or received over the air through the second horizontal portion and a second reference layer different from the first reference layer; and
an electromagnetic band gap layer configured to reduce a surface wave and disposed between the second horizontal portion and the second reference layer;
wherein the first wireless signal is in a first frequency band, the second wireless signal is in a second frequency band, and frequencies in the second frequency band are higher than frequencies in the first frequency band.

* * * * *